Jan. 29, 1957    H. STROHMEIER    2,779,861
FEEDING-DEVICE FOR CONDUCTING-WIRES, ESPECIALLY DESIGNED
FOR HEATING AND DRYING COATING-MATERIALS
APPLIED TO WELDING-RODS
Filed Oct. 29, 1954
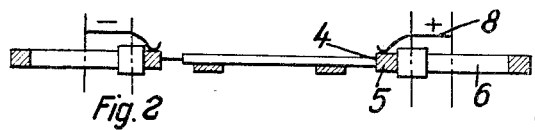
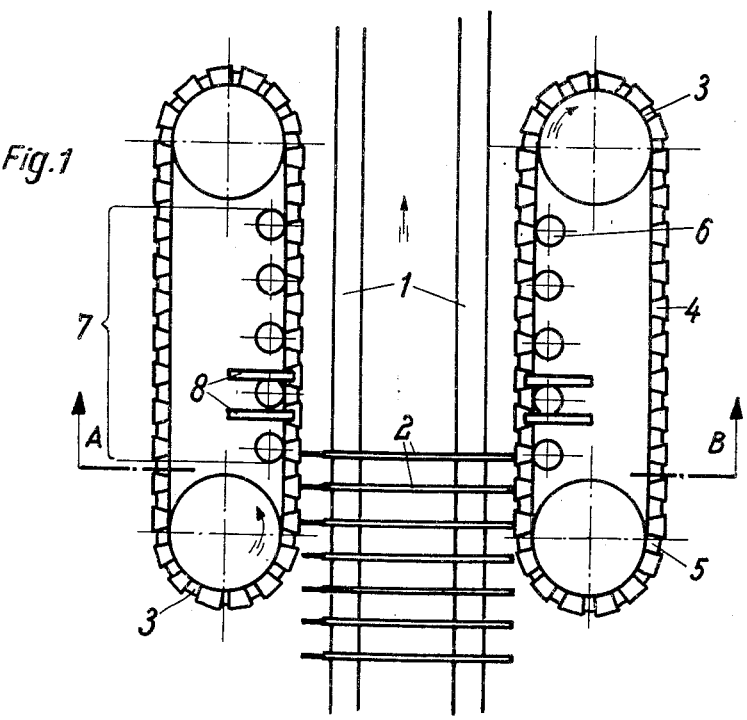
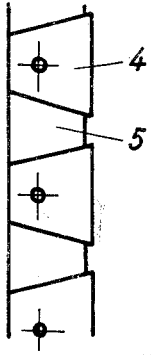
Inventor
H. Strohmeier

United States Patent Office 2,779,861
Patented Jan. 29, 1957

2,779,861

FEEDING-DEVICE FOR CONDUCTING-WIRES, ESPECIALLY DESIGNED FOR HEATING AND DRYING COATING-MATERIALS APPLIED TO WELDING-RODS

Harald Strohmeier, Kapfenberg, Steiermark, Austria

Application October 29, 1954, Serial No. 465,702

Claims priority, application Austria November 6, 1953

7 Claims. (Cl. 219—156)

This invention relates to a device for temporarily applying electric current to each of a succession of conducting members.

It is known to heat conducting members by inserting them as resistors in a circuit. This method is often employed for drying the coating of coated welding wires. In the manufacture of welding rods the latter drop from the press onto a conveyor belt on which they are carried in succession in parallel relationship. The welding wires arranged in succession are surrounded each by a moist coating, which is to be dried quickly and evenly. To this end the wires have been subjected to induction currents while on the conveyor belt. That method requires a very extensive and complicated plant because the drying can be effected only slowly and a large number of induction coils is required.

According to another known process, busbars are arranged on both sides of the conveyor belts and are contacted by the passing rods closing the circuit so that the rods themselves are heated. The welding rods being of short length and constituting good conductors, high current values are required to ensure a heating of these rods. These high current values involve the disadvantage that arcs are produced at the rod ends as the circuit is closed and particularly as it is broken. In view of the high current values these arcs cause local overheating with resulting damage to the coating.

It is an object of the invention to provide a device of the type described, in which the drawbacks of the known devices set forth hereinbefore are avoided. To this end the invention provides in the said device an endless belt conveyor adapted to carry the succession of conducting members such as welding rods to be dried, two endless contacting belts disposed on opposite sides of said belt conveyor, each of said contacting belts comprising a series of mutually insulated electrically conducting contact parts, said belt conveyor and contacting belts extending along parallel to each other and being movable in the same direction, said conducting members on said belt conveyor being adapted to be each contacted by and gripped between pairs of mutually opposite contact parts of said contacting belts when said belt conveyor and contacting belts are moved in the same direction, and wiping contact means arranged to apply current to mutually opposite contacts parts contacting one of said conducting members.

The contacting parts are in sliding engagement on one hand with wiping contacts and on the other hand contact one end of the welding wire. The several wiping contacts are connected to a source of current so as to ensure a supply of current to the welding rods passing by while avoiding a formation of arcs or increased heating due to poor contact. The current supply to the wiping contacts may be individually controlled to ensure a gradually increasing current supply to the welding rods. The arc as the circuit breaks may also be avoided by interrupting the supply of current to the contact parts while they are still in contact with the welding wires, that is, prior to releasing the grip of said contact parts.

An illustrative embodiment of the invention is shown in the drawing, in which:

Fig. 1 is a top plan view of a belt conveyor for carrying the welding rods ejected from the coating press, Fig. 2 is a sectional view taken on line A—B of Fig. 1 and showing the belt conveyor and part of the endless contacting belts through which current is applied for the resistance heating of the core wire, and Fig. 3 shows part of the endless contacting belt.

The coated welding rods 2 are placed in succession in parallel relation on the two belts of the conveyor 1, which feeds the welding rods through between two endless contacting belts 3 disposed on opposite sides of the ends of the welding rods and gripping the welding rods between them. The endless contacting belts comprise contact parts 4, which are interconnected by movable or elastic members 5 of electrically insulating material. The contact parts 4 are urged against the ends of the welding rod by spring-loaded rollers 6. During the travel through a predetermined path portion 7 the contact parts 4 are wiped by pairs of contact springs 8 (only two of which are shown in Fig. 1 for each belt) supplying the heating current. To prevent arcing as the circuit is opened and closed the path portion 7 is shorter than the total path portion in which the wires are clamped between the contact parts 4. To avoid overheating of the ends of the welding rods the current supplied through the wiping contacts may be increased in steps by supplying different currents to successive wiping contact pairs 8.

The simplest construction of the endless contacting belts may comprise a rubber belt 5 carrying spaced contact clamps 4, which are supplied with current through contact springs 8.

I claim:

1. A device for temporarily applying electric current to each of a succession of conducting members, comprising an endless belt conveyor adapted to carry said succession of conducting members, two endless contacting belts disposed on opposite sides of said belt conveyor, each of said contacting belts comprising a series of mutually insulated electrically conducting contact parts, said belt conveyor and contacting belts extending parallel to each other and being movable in the same direction and at the same speed, said conducting members on said belt conveyor being adapted to be each contacted by and gripped between a pair of mutually opposite contact parts of said contacting belts when said belt conveyor and contacting belts are moved in the same direction, and means arranged to apply current to mutually opposite contact parts contacting each of said conducting members.

2. A device as set forth in claim 1, in which the means arranged to apply current to mutually opposite contact parts are operative to apply current to two given mutually opposite contact parts only after the same have come into contact with one of said conducting members.

3. A device as set forth in claim 1, in which the means arranged to apply current to mutually opposite contact parts comprise a succession of wiping contacts.

4. A device as set forth in claim 1, in which the means arranged to apply current to mutually opposite contact parts are arranged to cease to apply current to two given mutually opposite contact parts while said contact parts are still in contact with one of said conducting members.

5. A device as set forth in claim 1, in which each of said contacting belts comprises a resilient insulating belt carrying said contact parts spaced thereon.

6. A device as set forth in claim 5, in which said insulating belt consists of rubber.

7. A device as set forth in claim 5, in which said insulating belt consists of plastics.

References Cited in the file of this patent

UNITED STATES PATENTS

| | | |
|---|---|---|
| 1,271,428 | Burns | July 2, 1918 |
| 1,288,866 | Friel | Dec. 24, 1918 |
| 1,873,619 | Majonnier | Aug. 23, 1932 |